Patented July 25, 1933

1,919,722

UNITED STATES PATENT OFFICE

JULIUS HYMAN, OF CHICAGO, ILLINOIS, ASSIGNOR TO VELSICOL CORPORATION, A CORPORATION OF ILLINOIS

PROCESS FOR PRODUCING POLYMERIZED UNSATURATED HYDROCARBONS OF RELATIVELY LIGHT COLOR AND PRODUCT THEREOF

No Drawing.   Application filed November 13, 1930.  Serial No. 495,422.

The invention herein described pertains to a process for the preparation of mineral drying oils possessing comparatively little color. Mineral drying oils are obtained through the polymerization of highly unsaturated lighter hydrocarbons of mineral origin such as are found in unrefined gasoline produced by so-called vapor phase oil cracking processes.

Vapor phase cracking processes are distinguished from liquid phase processes in that the former operate at relatively higher temperatures and relatively lower pressure than do the latter. The gasoline and gases produced by vapor phase cracking are generally much higher in unsaturates (particularly of the more reactive types) than are the gasolines and gases produced by liquid phase cracking.

In order to remove these highly unsaturated bodies, as well as color bodies, from vapor phase gasoline, such gasoline is treated with a polymerizing agent, such as fuller's earth or sulphuric acid, or simply by the application of heat and pressure in the presence or absence of a contact material. For example, in one such polymerizing process operating at present, the unrefined cracked gasoline vapors (which have been separated from heavier constituents by fractionation) are passed through a tower packed with fuller's earth or similar earthy polymerizing material. Here polymerization of the more active ingredients of the cracked vapors takes place, such polymers (along with some of the heavier ends of the gasoline) then being drained off in liquid form from the earthy polymerizing material. These polymers when brought, say, to a viscosity at 100° F. of 175 (Saybolt Universal) by removal of lighter materials through distillation, show pronounced drying qualities equal to and, in many instances, superior to vegetable drying oils.

Polymers prepared in this way, however, are very deep in color, usually possessing a reddish or brownish tone in a thin film, and opaque to ordinary daylight in a layer thickness of, say, two inches; indeed, many samples of these mineral drying oils are opaque to daylight in much thinner layers. For this reason, mineral drying oils thus prepared are unsuited for the manufacture of products requiring paleness or high transparency in the vehicle, for instance, white paints, pale varnishes and the like.

If, however, unrefined vapor phase cracked gasoline be fractionated carefully, it will be found that the first fraction—which, in 400° F. end point (Engler) gasoline, may exceed 25% of the total—is of a +16 Saybolt color, or better; that is to say, this first fraction is either colorless to the eye, or at most, possesses but a very faint yellow color.

The present invention resides in the treatment of this first fraction of unrefined vapor phase cracked gasoline with a polymerizing agent which, under the conditions of treatment should react very mildly with the gasoline to produce polymers possessing either no color, or colors much lighter than those possessed by the polymers heretofore described. Mineral drying oils of most unusual drying power (drying in some instances in less than one-quarter the time required by raw linseed oil) may be prepared from the polymers resulting from the treatment of the colorless unrefined vapor phase cracked gasoline fraction, by reducing these polymers to the proper viscosity through distillation.

These mineral drying oils furthermore are considerably lighter in color than are those resulting from the polymerization of the entire unrefined vapor phase cracked gasoline cut and, the milder the polymerization, the lighter the color.

It is easily possible thus to prepare mineral drying oils of an amber color, which, in layer thicknesess of two inches, are not opaque to daylight.

As previously stated, the color of the mineral drying oils resulting from the polymerization of certain portions of the first, pale cut of unrefined vapor phase cracked gasoline will depend largely on the severity of the polymerization. Such polymerization can be accomplished by liquid or vapor phase treatment of such fraction with active contact materials, such as fuller's earth, clay or similar earthy polymerizing materials, or with certain active chemicals, such as dilute (for example, 68% by volume) sulphuric acid, or other polymerizing agents; or by combined heat and pressure, in the presence or absence of contact materials. In all cases, temperature and time of reaction should be kept as low as compatible with the nature of the polymerizing agents, as well as the costs involved, in order to produce mineral drying oils of very pale color.

In certain instances it may be desirable to subject the fraction to be treated to a series of polymerizations, the polymerizing conditions becoming more severe with each operation, and the polymers being removed after each successive operation. In instances where sulfur compounds in the unrefined fraction tend to form objectionable compounds in the polymers, these sulfur compounds may be removed from the original gasoline or its useful fractions by caustic washes or other mild desulfurizing means not calculated to affect appreciably the unsaturation of the gasoline.

In order to illustrate the invention the following example may be cited:

Unrefined vapor phase cracked gasoline having an initial boiling point of approximately 90° F. and an end point of approximately 410° F. (Engler) may be refractionated. The first cut approximating 25% of the whole, may have an end point (Engler) of approximately 235° F. and a color of approximately +16 Saybolt. This fraction may be vaporized and the vapors passed through a tower filled with a polymerizing material such as active clay, the vapors having an entering temperature of approximately 175° F. The time of contact of vapors and clay may be approximately one minute. The vapors together with the liquid condensate formed by the polymerizing action of the clay are allowed to cool until about 10% of the original mass of unrefined vapor phase cracked gasoline has dropped from the vapor stream as a liquid.

This liquid, which possesses a light amber color, may be then introduced into a still wherein the lighter materials are preferably distilled off (if necessary with the aid of steam) until the residue possesses a viscosity at 100° F. of about 175 (Saybolt Universal). Said residue is a transparent yellow liquid which, upon exposure of a thin film to air, acquires a tackiness within a very few minutes and dries within six hours. Under similar conditions raw linseed oil would take at least fifty hours to dry.

Instead of starting with unrefined vapor phase gasoline in liquid state and refractionating same to secure the desired lighter cut, the unrefined vapor phase cracked gasoline may be continuously removed from the fractionator of a concurrently operating vapor phase cracking system, my only aim being to separate a lighter fraction from the unrefined vapor phase cracked gasoline either in liquid or vapor form. I do not wish to be limited to a 25% cut. This cut may be materially higher or lower than 25%, depending almost entirely on the color.

While I have specified the selection of a fraction having a color of about +16 Saybolt or better, it is to be understood that I do not wish to be limited in any way to the selection of such a fraction. The broad concept of my invention comprises fractionating unrefined vapor phase cracked gasoline to separate the maximum amount of the lighter fraction which upon being subjected to polymerizing action will produce a residue of relatively light color.

The term "unrefined" as used herein refers to cracked gasoline in which the unsaturation and color is substantially the same as in the untreated product. In other words, gasoline may be caustic washed or subjected to mild desulphurization without thereby being removed from the class of unrefined gasoline.

I claim as my invention:

1. A process of producing polymerized unsaturated compounds transparent to light in a layer thickness of two inches and possessing drying characteristics equal or superior to vegetable drying oils, which comprises fractionating unrefined vapor phase cracked gasoline to separate a lighter condensable fraction having an end point not over approximately 235° F. from a heavier fraction, subjecting the lighter condensable fraction to polymerization, and separating the residue containing polymerized unsaturated hydrocarbons, to obtain a polymerized residue transparent to light in a layer thickness of two inches.

2. A process of producing polymerized unsaturated compounds transparent to light in a layer thickness of two inches and possessing drying characteristics equal or superior to vegetable drying oils, which comprises fractionating unrefined vapor phase cracked gasoline to separate a lighter condensable fraction having a color not yellower than +16 Saybolt from a heavier fraction, subjecting the lighter condensable fraction in vapor form to polymerization, separating the residue containing polymerized unsaturated hydrocarbons, to obtain a polymerized residue transparent to light in a layer thickness of two inches.

3. A process of producing polymerized unsaturated compounds transparent to light in a layer thickness of two inches and possessing drying characteristics equal or superior to vegetable drying oils, which comprises fractionating unrefined vapor phase cracked gasoline to separate a lighter condensable fraction having an end point not over approximately 235° F. from a heavier fraction, subjecting the lighter condensable fraction to polymerization, separating the residue containing polymerized unsaturated hydrocarbons, to obtain a polymerized residue of relatively light color and thereafter distilling said residue to remove sufficient of the lower boiling materials therein to leave a residue transparent to light in a layer thickness of two inches.

4. A process of producing polymerized unsaturated compounds transparent to light in a layer thickness of two inches and possessing drying characteristics equal or superior to vegetable drying oils, which comprises subjecting a lighter fraction having an end point not over approximately 235° F. of unrefined vapor phase cracked gasoline to polymerization, and controlling the temperature and time of polymerization to secure a polymerized residue transparent to light in a layer thickness of two inches.

5. A process of producing polymerized unsaturated compounds transparent to light in a layer thickness of two inches and possessing drying characteristics equal or superior to vegetable drying oils, which comprises subjecting a lighter fraction having an end point not over approximately 235° F. of unrefined vapor phase cracked gasoline to polymerization, controlling the temperature and time of polymerization to secure a polymerized residue transparent to light in a layer thickness of two inches, and thereafter subjecting said residue of relatively light color to distillation to remove sufficient of the lower boiling materials thereof to leave a residue of desired viscosity.

6. A polymerized product transparent to light, in a layer thickness of two inches and possessing drying characteristics equal or superior to vegetable drying oils obtainable by the polymerization of lighter fractions of unrefined vapor phase cracked gasoline.

7. A new product transparent to light in a layer thickness of two inches consisting essentially of polymerized unsaturated mineral hydrocarbons possessing drying characteristics equal or superior to vegetable drying oils obtainable by the polymerization of lighter fractions of unrefined vapor phase cracked gasoline.

8. A new product transparent to light in a layer thickness of two inches consisting essentially of polymerized unsaturated mineral hydrocarbons capable of oxidizing on exposure to air at normal atmospheric temperatures to produce a hard, dry film obtainable by the polymerization of lighter fractions of unrefined vapor phase cracked gasoline.

9. A new product transparent to light in a layer thickness of two inches, consisting essentially of polymerized unsaturated bodies formed by the polymerization of the lighter fraction of unrefined vapor phase cracked gasoline, possessing drying characteristics equal or superior to vegetable drying oils.

JULIUS HYMAN.